(12) United States Patent
Asai et al.

(10) Patent No.: US 10,193,118 B2
(45) Date of Patent: Jan. 29, 2019

(54) HYDROXIDE-ION-CONDUCTIVE DENSE MEMBRANE AND COMPOSITE MATERIAL

(71) Applicant: NGK INSULATORS, LTD., Nagoya-Shi (JP)

(72) Inventors: Kouta Asai, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 4 days.

(21) Appl. No.: 15/164,982

(22) Filed: May 26, 2016

(65) Prior Publication Data

US 2016/0268568 A1     Sep. 15, 2016

Related U.S. Application Data

(63) Continuation of application No. PCT/JP2015/078825, filed on Oct. 9, 2015.

(30) Foreign Application Priority Data

Jan. 28, 2015  (JP) ................... 2015-013914

(51) Int. Cl.
*H01M 2/16*       (2006.01)
*H01M 10/36*      (2010.01)
(Continued)

(52) U.S. Cl.
CPC ............. *H01M 2/1646* (2013.01); *B32B 5/18* (2013.01); *H01M 2/166* (2013.01); (Continued)

(58) Field of Classification Search
CPC ................................................ H01M 10/26
See application file for complete search history.

(56) References Cited

U.S. PATENT DOCUMENTS

2010/0212712 A1\*  8/2010  Tran .................. C06C 15/00
                                                           136/205
2012/0077109 A1\*  3/2012  Hong .................. C08J 5/22
                                                           429/492
(Continued)

FOREIGN PATENT DOCUMENTS

CN    1333113 C    8/2007
EP    3 139 437 A1  3/2017
(Continued)

OTHER PUBLICATIONS

Liu et al, "Structured chiral adsorbent formed by cyclodextrinmodified layered solid film", Feb. 2009.\*

(Continued)

*Primary Examiner* — Barbara L Gilliam
*Assistant Examiner* — Nathanael T Zemui
(74) *Attorney, Agent, or Firm* — Burr & Brown, PLLC

(57) ABSTRACT

Provided is a hydroxide-ion-conductive dense membrane having a He permeability per unit area of 10 cm/min·atm or less. The present invention provides a highly-densified hydroxide-ion-conductive membrane that can significantly reduce permeation of substances other than hydroxide ions (in particular, Zn, which may cause growth of dendritic zinc in a zinc secondary battery) and that is particularly suitable for use in, for example, a separator for a battery (in particular, a zinc secondary battery, which may cause growth of dendritic zinc).

15 Claims, 8 Drawing Sheets

(51) Int. Cl.
*H01M 12/08* (2006.01)
*B32B 5/18* (2006.01)
*H01B 1/06* (2006.01)

(52) U.S. Cl.
CPC ......... *H01M 2/1686* (2013.01); *H01M 10/36* (2013.01); *H01M 12/08* (2013.01); *H01B 1/06* (2013.01); *H01M 2300/0065* (2013.01); *H01M 2300/0068* (2013.01); *Y02E 60/128* (2013.01)

(56) References Cited

U.S. PATENT DOCUMENTS

| | | | |
|---|---|---|---|
| 2014/0227616 A1 | 8/2014 | Yamada et al. | |
| 2014/0315099 A1* | 10/2014 | Yamada | H01M 10/24 429/304 |
| 2015/0340680 A1 | 11/2015 | Fujisaki et al. | |
| 2015/0364790 A1* | 12/2015 | Yonehara | H01G 11/52 429/314 |

FOREIGN PATENT DOCUMENTS

| | | | | |
|---|---|---|---|---|
| EP | 3 235 789 A1 | 10/2017 | | |
| JP | WO 2013118561 A1 * | 8/2013 | ............ | H01M 10/24 |
| JP | 2013-191523 A1 | 9/2013 | | |
| JP | WO 2014119665 A1 * | 8/2014 | ............ | H01G 11/52 |
| JP | 2015-095286 A1 | 5/2015 | | |
| WO | 2006/050648 A1 | 5/2006 | | |
| WO | 2011/013004 A1 | 2/2011 | | |
| WO | 2013/073292 A1 | 5/2013 | | |
| WO | 2013/118561 A1 | 8/2013 | | |
| WO | 2015/098612 A1 | 7/2015 | | |

OTHER PUBLICATIONS

Lu et al, "Microstructure-controlled synthesis of oriented layered double hydroxide thin films: Effect of varying the preparation conditions and a kinetic and mechanistic study of film formation", Chemical Engineering Science 62 (2007) 6069-6075.*

Lu et al, "In situ growth of layered doublehydroxide films onanodic aluminum oxide/aluminum and its catalytic feature in aldol condensation of acetone", Chemical Engineering Science 63 (2008) 4055-4062.*

Tadanaga et al, "Effect of Mg/Al Ratio on Hydroxide Ion Conductivity for Mg—Al Layered Double Hydroxide and Application to Direct Ethanol Fuel Cells", Journal of The Electrochemical Society, 159 (4) B368-B370 (2012).*

Xiaoxiao Guo, Fazhi Zhang, David G. Evans and Xue Duan, "Layered double hydroxide films: synthesis, properties and applications", The Royal Society of Chemistry, Chem. Commun., 2010, 46, 5197-5210, Accepted May 14, 2010, First published as an Advance Article on the web Jun. 15, 2010.*

F. Javier Echave, Oihane Sanz, Luciano C. Almeida, José Antonio, Odriozola, Mario Montes, "Highly porous hydrotalcite-like film growth on anodised aluminium monoliths", Studies in Surface Science and Catalysis, vol. 175, 2010, pp. 639-642, Available online Jul. 8, 2010.*

Zhenxin Xu, Ning Wang, Wei Chu, Jie Dengac and Shizhong Luo; "In situ controllable assembly of layered-doublehydroxide-based nickel nanocatalysts for carbon dioxide reforming of methane"; Catal. Sci. Technol., 2015, 5, 1588-1597.First published on Nov. 28, 2014 (Year: 2014).*

Zhi Lu, et al., "Microstructure-Controlled Synthesis of Oriented Layered Double Hydroxide Thin Films: Effect of Varying the Preparation Conditions and a Kinetic and Mechanistic Study of Film Formation," *Chemical Engineering Science*, vol. 62, Issue 21, 2007, pp. 6069-6075.

Jae-Min Oh, et al., "The Effect of Synthetic Conditions on Tailoring the Size of Hydrotalcite Particles," *Solid State Ionics*, vol. 151, Issues 1-4, Nov. 2002, pp. 285-291.

International Search Report and Written Opinion (Application No. PCT/JP2015/078825) dated Dec. 1, 2015 (with English translation).

English Translation of International Search Report, International Application No. PCT/JP2015/078825, dated Aug. 4, 2016 (2 pages).

English translation of the Written Opinion (Application No. PCT/JP2015/078825) of the International Search Authority dated Dec. 1, 2015.

Extended European Search Report, European Application No. 15862135.9, dated Jun. 29, 2018 (8 pages).

* cited by examiner

HYDROXIDE-ION-CONDUCTIVE DENSE MEMBRANE AND COMPOSITE MATERIAL

CROSS-REFERENCE TO RELATED APPLICATIONS

This application is a continuation application of PCT/JP2015/078825 filed Oct. 9, 2015, which claims priority to Japanese Patent Application No. 2015-013914 filed Jan. 28, 2015, the entire contents all of which are incorporated herein by reference.

BACKGROUND OF THE INVENTION

1. Field of the Invention

The present invention relates to a hydroxide-ion-conductive dense membrane and a composite material.

2. Description of the Related Art

Layered double hydroxides (hereinafter also referred to as LDHs), such as hydrotalcite, are compounds that contain exchangeable anions between hydroxide layers. Because of their characteristics, LDHs have been used as catalysts and absorbents, as well as dispersants in polymers in order to improve the thermal resistance of the polymers. In particular, LDHs have recently been attracting attention as materials exhibiting hydroxide ion conductivity, and also studied for use as electrolytes in alkaline fuel cells or additives in catalytic layers of zinc-air batteries.

Traditional applications of LDHs (e.g., catalysts) require high specific surface area, and thus it was sufficient to synthesize and use powdery LDH for such applications. In contrast, in consideration of applications of LDHs to electrolytes in, for example, alkaline fuel cells making use of the hydrogen ion conductivity of the LDHs, a highly-densified LDH membrane is desired in order to prevent fuel gas from mixing and to achieve sufficient electromotive force.

Patent Documents 1 and 2 and Non-Patent Document 1 disclose oriented LDH membranes. These oriented LDH membranes are produced by horizontally suspending the surface of a polymer substrate in a solution containing urea and a metal salt to cause nucleation and oriented growth of LDH. The oriented LDH membranes of these Documents each show a strong peak of (003) plane in the X-ray diffraction pattern.

Zinc secondary batteries, such as nickel-zinc secondary batteries and zinc-air secondary batteries, have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. Thus, a strong demand has arisen for a technique for preventing the short circuit resulting from dendritic zinc in zinc secondary batteries, such as nickel-zinc secondary batteries and zinc-air secondary batteries.

CITATION LIST

Patent Documents

Patent Document 1: CNC1333113
Patent Document 2: WO2006/050648

Non-Patent Document

Non-Patent Document 1: Zhi Lu, Chemical Engineering Science, 62, pp. 6069-6075 (2007), "Microstructure-controlled synthesis of oriented layered double hydroxide thin films: Effect of varying the preparation conditions and a kinetic and mechanistic study of film formation"

SUMMARY OF THE INVENTION

The present inventors have in advance successfully produced an LDH dense bulk block (hereinafter referred to as "LDH dense body"). In addition, experiments on hydroxide ion conductivity of the LDH dense body have revealed that the LDH dense body exhibits a high ion conductivity along the layers of LDH particles. Unfortunately, the high resistance of the LDH dense body may cause problems in the application of LDH to solid electrolyte separators for alkaline secondary batteries, such as zinc-air batteries and nickel-zinc batteries. For the practical use of LDH, it is desirable to reduce the resistance by forming a thin LDH membrane. In view of this, the oriented LDH membranes disclosed in Patent Documents 1 and 2 and Non-Patent Document 1 are inadequate in terms of density. Thus, a highly-densified LDH membrane is desired. In particular, the application of an LDH dense membrane to a solid electrolyte separator requires efficient migration of hydroxide ions contained in the electrolytic solution through the membrane, while the membrane is desired to have a density sufficient to prevent permeation of substances other than hydroxide ions (in particular, Zn, which may cause growth of dendritic zinc in a zinc secondary battery, and carbon dioxide, which may cause precipitation of an alkaline carbonate in a zinc-air battery). Such a high density is desired not only for LDH dense membranes, but also for dense membranes composed of other organic and inorganic materials exhibiting hydroxide ion conductivity.

The present inventors have found that a high-density membrane exhibiting hydroxide ion conductivity and having a He permeability per unit area of 10 cm/min·atm or less can significantly reduce permeation of substances other than hydroxide ions (in particular, Zn, which may cause growth of dendritic zinc in a zinc secondary battery). The present inventors have also found that the hydroxide-ion-conductive dense membrane is particularly suitable for use in, for example, a separator for a battery (in particular, a zinc secondary battery, which may cause growth of dendritic zinc).

An object of the present invention is to provide a high-density hydroxide-ion-conductive membrane that can significantly reduce permeation of substances other than hydroxide ions (in particular, Zn, which may cause growth of dendritic zinc in a zinc secondary battery) and that is particularly suitable for use in, for example, a separator for a battery (in particular, a zinc secondary battery, which may cause growth of dendritic zinc).

An aspect of the present invention provides a hydroxide-ion-conductive dense membrane having a He permeability per unit area of 10 cm/min·atm or less.

Another aspect of the present invention provides a composite material comprising a porous substrate and the hydroxide-ion-conductive dense membrane according to the above aspect, the hydroxide-ion-conductive dense membrane being disposed on at least one surface of the porous substrate.

Still another aspect of the present invention provides a battery comprising a separator comprising the hydroxide-ion-conductive dense membrane or the composite material.

DETAILED DESCRIPTION OF THE INVENTION

Hydroxide-Ion-Conductive Dense Membrane

The present invention relates to a hydroxide-ion-conductive dense membrane. The hydroxide-ion-conductive dense membrane is preferably a layered double hydroxide dense membrane (LDH dense membrane), but may be any dense membrane exhibiting hydroxide ion conductivity; for example, a membrane containing an inorganic and/or organic material exhibiting hydroxide ion conductivity. The hydroxide-ion-conductive dense membrane is desired to have high density sufficient to exhibit water impermeability. The dense membrane, which exhibits hydroxide ion conductivity and water impermeability, can function as a separator for a battery. As described above, LDH dense bulk blocks are not suitable for solid electrolyte separators for batteries due to their high resistance. In contrast, the LDH dense membrane can achieve a small thickness and a low resistance. Thus, the dense membrane is very useful as a material for a solid electrolyte separator of various batteries, such as metal-air batteries (e.g., zinc-air batteries) and other zinc secondary batteries (e.g., nickel-zinc batteries). If the dense membrane has local and/or incidental defects exhibiting water permeability, the defects may be filled with an appropriate repairing agent (e.g., an epoxy resin) for ensuring water impermeability. Such a repairing agent does not necessarily exhibit hydroxide ion conductivity.

Figure 5:
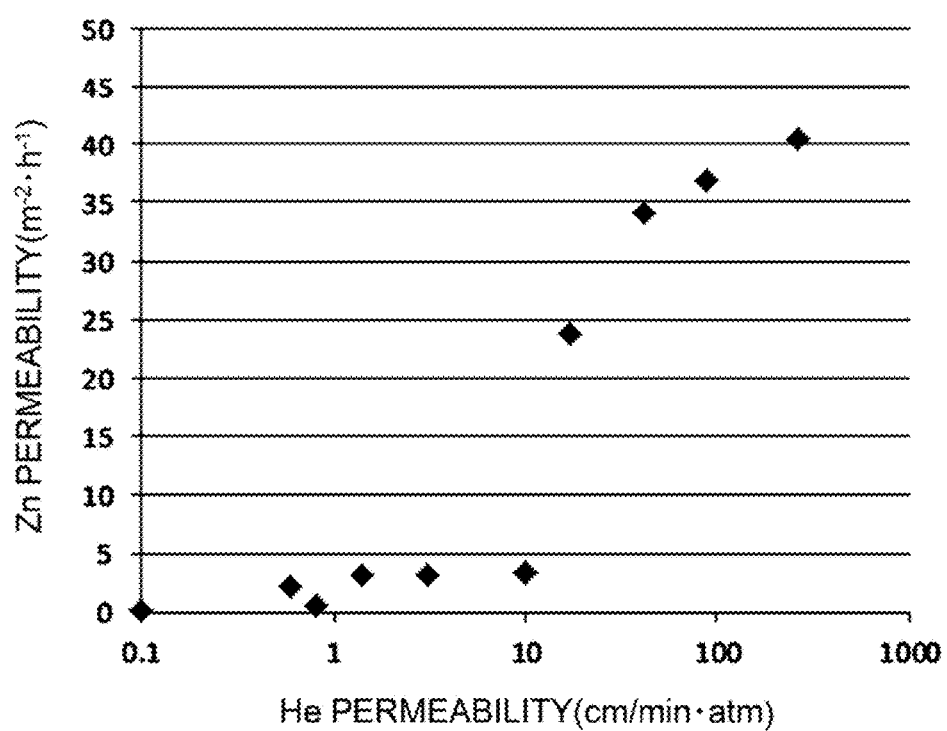
FIG. 5 is a graph showing the relationship between He permeability and Zn permeability determined in Examples A3 and A4.

The hydroxide-ion-conductive dense membrane of the present invention has very high density as described above. Specifically, the hydroxide-ion-conductive dense membrane of the present invention has a He permeability per unit area of 10 cm/min·atm or less, preferably 5.0 cm/min·atm or less, more preferably 1.0 cm/min·atm or less. A dense membrane having a He permeability of 10 cm/min·atm or less can effectively prevent permeation of Zn in an electrolytic solution. For example, as illustrated in FIG. 5, a He permeability of 10 cm/min·atm or less leads to a significant reduction in Zn permeability per unit area as determined by the contact of the membrane with water. The upper limit of He permeability of 10 cm/min·atm is critical for the hydroxide-ion-conductive dense membrane to exhibit the effect of reducing Zn permeation. Thus, the dense membrane of the present invention significantly reduces Zn permeation. In principle, the use of the dense membrane as a hydroxide-ion-conductive separator for a secondary battery (e.g., a zinc secondary battery) can effectively prevent growth of dendritic zinc. Accordingly, the present invention provides a high-density hydroxide-ion-conductive membrane that can significantly reduce permeation of substances other than hydroxide ions (in particular, Zn, which may cause growth of dendritic zinc in a zinc secondary battery) and that is particularly suitable for use in, for example, a separator for a battery (in particular, a zinc secondary battery, which may cause growth of dendritic zinc).

The hydroxide-ion-conductive dense membrane of the present invention, which has very high density as described above, can significantly reduce permeation of carbon dioxide, which may cause precipitation of an alkaline carbonate in a zinc-air battery. Since $CO_2$ molecules of carbon dioxide gas are much larger in size than He atoms of He gas, a low He permeability as described above necessarily indicates a low $CO_2$ permeability. Thus, the dense membrane of the present invention is also suitable for use in metal-air batteries, such as zinc-air batteries, which may cause precipitation of an alkaline carbonate in an electrolytic solution. In a metal-air battery, such as a zinc-air battery, carbon dioxide contained in air may pass through the air electrode and dissolve in the electrolytic solution, leading to precipitation of an alkaline carbonate, resulting in poor battery performance. The dense membrane of the present invention can effectively address such a problem.

The determination of He permeability involves a step of feeding He gas to one surface of the hydroxide-ion-conductive dense membrane so that the He gas permeates the dense membrane, and a step of evaluating the density of the hydroxide-ion-conductive dense membrane on the basis of the calculated He permeability. The He permeability is calculated by the expression $F/(P \times S)$ where F represents the amount of He gas permeated per unit time. P represents a differential pressure applied to the dense membrane during permeation of He gas, and S represents the area of the membrane through which He gas permeates. Such determination of the He gas permeability leads to highly accurate evaluation of the density of the membrane, resulting in effective evaluation of a density sufficient to prevent permeation (to allow permeation of very small amounts) of substances other than hydroxide ions (in particular, Zn, which may cause growth of dendritic zinc in a zinc secondary battery, and carbon dioxide, which may cause precipitation of an alkaline carbonate in a zinc-air battery). This effective evaluation is attributed to the following fact. He gas has very low reactivity and consists not of molecules but of He atoms each being the smallest in size among various gaseous atoms and molecules. In contrast, hydrogen gas consists of $H_2$ molecules each being larger in size than a He atom, and $H_2$ gas is dangerous due to its combustibility. The He gas permeability determined by the aforementioned expression can be used for the objective and convenient evaluation of density, regardless of the size of a sample or the conditions of measurement. Thus, the He permeability can be used for conveniently, safely, and effectively determining whether the hydroxide-ion-conductive dense membrane has a sufficiently high density suitable for use in, for example, a separator for a battery.

For determination of the He permeability, He gas is fed to one surface of the hydroxide-ion-conductive dense membrane so that the He gas permeates the dense membrane.

Figure 1A:
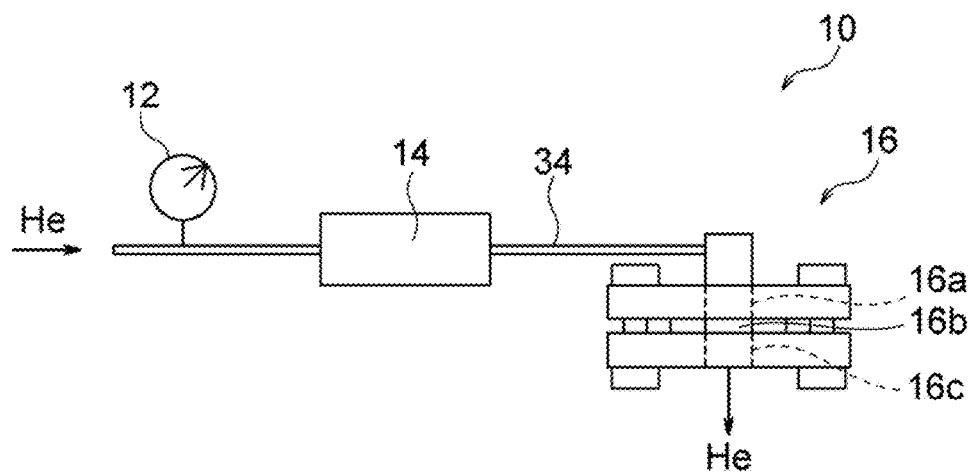
FIG. 1A is a schematic illustration of an exemplary system for determining He permeability.

Preferably. He gas is fed in a permeameter system that can specify the amount F of He gas permeated per unit time, the differential pressure P applied to the dense membrane during permeation of He gas, and the area S of the membrane through which He gas permeates, so as to calculate the He permeability in subsequent steps. FIG. 1A illustrates an exemplary system for determining the He permeability. The He permeameter system 10 illustrated in FIG. 1A includes a pressure gauge 12, a flowmeter 14, and a sample holder 16 that holds a dense membrane. In the permeameter system 10. He gas is fed to the sample holder 16 through the pressure gauge 12 and the flowmeter 14 and then fed to one surface of the dense membrane held by the sample holder 16. The He gas permeates the dense membrane and exits through the other surface.

Figure 1B:
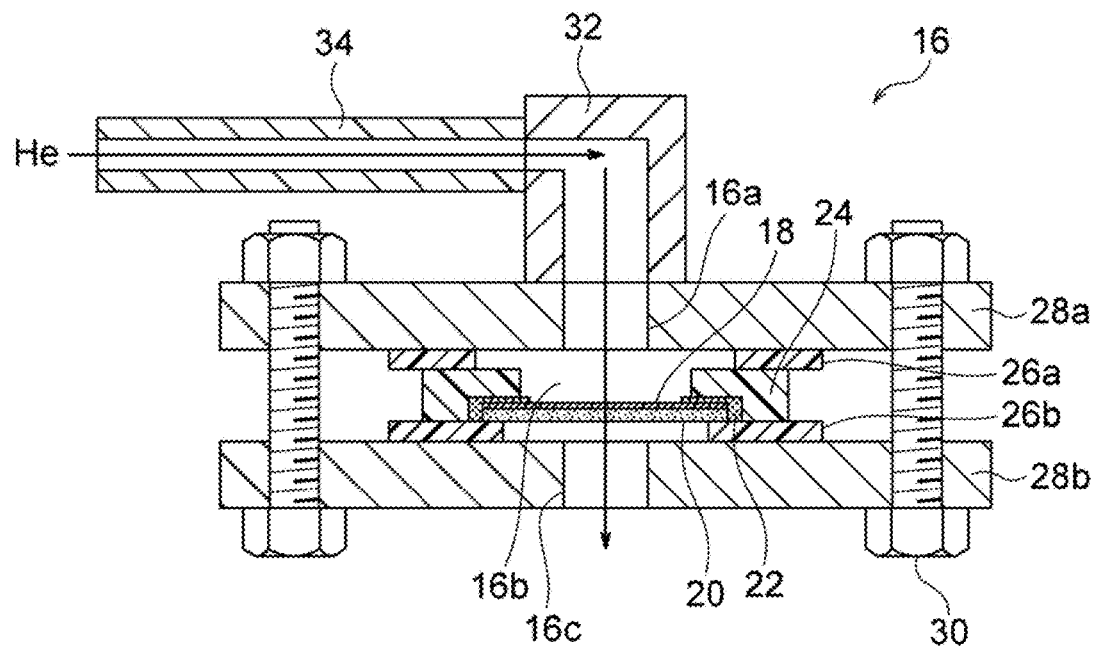
FIG. 1B is a schematic cross-sectional view of a sample holder used in the system illustrated in FIG. 1A and components provided around the sample holder.

The dense membrane is preferably held by the sample holder 16 before the feed of He gas. FIGS. 1A and 1B illustrate an example of the sample holder 16. As illustrated in these figures, the sample holder 16 includes a gas inlet 16a through which He gas is introduced into the sample holder 16, a hermetic space 16b in which the He gas is fed to a specific region of one surface of the dense membrane 18, and a gas outlet 16c through which the He gas permeated through the dense membrane 18 exits. This configuration ensures that He gas fed through the gas inlet 16a into the hermetic space 16b permeates the dense membrane 18 and then exits through the gas outlet 16c. Thus, the amount F of He gas permeated per unit time can be accurately determined. The sample holder 16 can be conveniently formed from readily available members. For example, the sample holder 16 illustrated in FIG. 1B includes a jig 24 having a central opening and disposed along the periphery of the dense membrane 18 with an adhesive 22. The dense membrane 18 is preferably provided in the form of a composite material; i.e., disposed on a porous substrate 20. Sealing members (e.g., packings) 26a and 26b are respectively disposed on the upper and lower surfaces of the jig 24, and support members having openings (e.g., flanges) 28a and 28b are respectively disposed on the sealing members 26a and 26b. Thus, the hermetic space 16b is defined by the dense membrane 18, the jig 24, the sealing member 26a, and the support member 28a. If the dense membrane 18 is provided in the form of a composite material; i.e., disposed on the porous substrate 20, the dense membrane 18 is preferably disposed so as to face the gas inlet 16a in view of prevention of removal of the dense membrane 18 from the porous substrate 20 due to the pressure of He gas fed. The paired support members 28a and 28b are preferably fastened to each other with fasteners (e.g., screws) 30 so as to prevent leakage of He gas through sites other than the gas outlet 16c. A tube 34 for feeding He gas may optionally be connected to the gas inlet 16a with a joint 32. This configuration facilitates the assembly and disassembly of the sample holder, and thus achieves efficient evaluation of the He gas permeabilities of many dense membranes.

The He permeability is then calculated to evaluate the density of the hydroxide-ion-conductive dense membrane. The He permeability is calculated by the expression $F/(P \times S)$ where F represents the amount of He gas permeated per unit time, P represents a differential pressure applied to the dense membrane during permeation of He gas, and S represents the area of the membrane through which He gas permeates. The parameters F, P, and S each may have any unit. Preferably, the amount F of He gas permeated per unit time has a unit of $cm^3/min$, the differential pressure P has a unit of atm, and the area S has a unit of $cm^2$. The differential pressure P is controlled so that He gas permeates the dense membrane. He gas is fed to achieve a differential pressure P of preferably 0.001 to 10 atm, more preferably 0.01 to 3 atm, still more preferably 0.01 to 0.9 atm, particularly preferably 0.05 to 0.9 atm.

As described above. Zn barely permeates the dense membrane of the present invention during the contact of the membrane with a liquid. Specifically, the dense membrane of the present invention has a Zn permeability per unit area of preferably 10 $m^{-2} \cdot h^{-1}$ or less, more preferably 5.0 $m^{-2} \cdot h^{-1}$ or less, still more preferably 4.0 $m^{-2} \cdot h^{-1}$ or less, still more preferably 3.0 $m^{-2} \cdot h^{-1}$ or less, still more preferably 1.0 $m^{-2} \cdot h^{-1}$ or less, as determined by the contact of the membrane with water. Such a low Zn permeability indicates that the permeation of Zn through the membrane is very effectively prevented in an electrolytic solution. In principle, the use of the dense membrane as a hydroxide-ion-conductive separator for a secondary battery (e.g., a zinc secondary battery) can effectively prevent growth of dendritic zinc.

The determination of Zn permeability involves a step of causing Zn to permeate the dense membrane for a predetermined period of time, and a step of calculating Zn permeability. Zn is caused to permeate the hydroxide-ion-conductive dense membrane by bringing one surface of the dense membrane into contact with a first aqueous solution containing Zn, and bringing the other surface of the dense membrane into contact with water or a second aqueous solution not containing Zn. The Zn permeability is calculated by the expression $(C_2 \times V_2)/(C_1 \times V_1 \times t \times S)$ where $C_1$ represents the Zn concentration of the first aqueous solution before the permeation of Zn, $V_1$ represents the volume of the first aqueous solution before the permeation of Zn, $C_2$ represents the Zn concentration of the second aqueous solution or water after the permeation of Zn, $V_2$ represents the volume of the second aqueous solution or water after the permeation of Zn, t represents the permeation time of Zn, and S represents the area of the membrane through which Zn permeates. The parameters $C_1$, $C_2$, $V_1$, $V_2$, t, and S each may have any unit if the concentrations $C_1$ and $C_2$ have the same unit and the volumes $V_1$ and $V_2$ have the same unit. Preferably, the permeation time t of Zn has a unit of h, and the area S of the membrane has a unit of $m^2$. The Zn concentration $C_1$ of the first aqueous solution before the permeation of Zn is preferably 0.001 to 1 mol/L, more preferably 0.01 to 1 mol/L, still more preferably 0.05 to 0.8 mol/L, particularly preferably 0.2 to 0.5 mol/L, most preferably 0.35 to 0.45 mol/L. The permeation time of Zn is preferably 1 to 720 hours, more preferably 1 to 168 hours, still more preferably 6 to 72 hours, particularly preferably 12 to 24 hours. Such determination of the Zn permeability with an aqueous Zn-containing solution and an aqueous Zn-free solution leads to highly accurate evaluation of the density of the membrane, resulting in reliable and precise evaluation of a density sufficient to prevent permeation (to allow permeation of a very small amount) of Zn, which may cause growth of dendritic zinc in a zinc secondary battery. The Zn permeability determined by the aforementioned expression can be used for the objective and convenient evaluation of density, regardless of the size of a sample or the conditions of measurement. The Zn permeability can be used as an effective index for determining the degree of precipitation of dendritic zinc, for the following reason. In principle, the use of the hydroxide-ion-conductive dense membrane as a separator for a zinc secondary battery can effectively prevent growth of dendritic zinc in a Zn-free electrolytic solution (at the positive electrode) if Zn contained in an electrolytic solution (at the zinc negative electrode) in contact with one surface of the dense membrane does not permeate the membrane into the Zn-free electrolytic solution in contact with the other surface of the membrane. According to this embodiment, the Zn permeability can be used for reliably and accurately determining whether the hydroxide-ion-conductive dense membrane has a sufficiently high density suitable for use in, for example, a separator for a battery (in particular, a zinc secondary battery, which may cause growth of dendritic zinc).

Figure 2A:
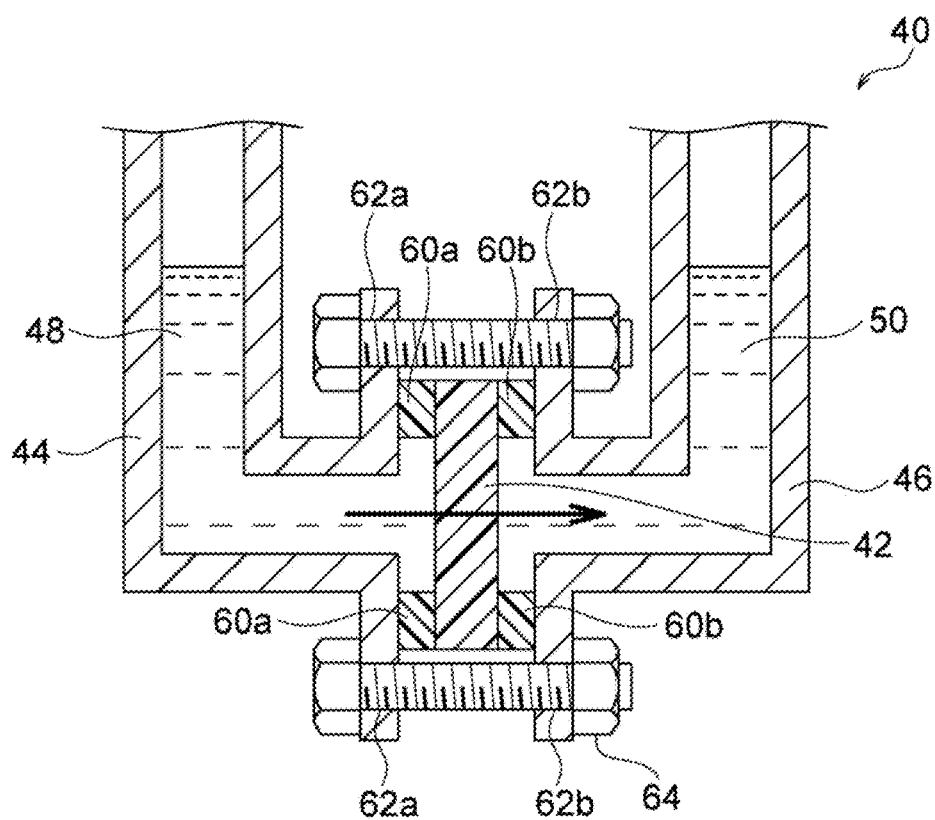
FIG. 2A is a schematic illustration of an exemplary device for determining Zn permeability.

For determination of the Zn permeability, one surface of the hydroxide-ion-conductive dense membrane is brought into contact with a first aqueous solution containing Zn so that Zn permeates the membrane into a second aqueous solution not containing Zn or water (hereinafter collectively referred to as "second aqueous solution") in contact with the other surface of the membrane. Preferably, the membrane is brought into contact with these aqueous solutions in a permeameter that can specify the Zn concentration $C_1$ of the first aqueous solution before the permeation of Zn, the volume $V_1$ of the first aqueous solution before the permeation of Zn, the Zn concentration $C_2$ of the second aqueous solution or water after the permeation of Zn, the volume $V_2$ of the second aqueous solution or water after the permeation of Zn, and the area S of the membrane through which Zn permeates, so as to calculate the Zn permeability in subsequent steps. FIG. 2A illustrates an exemplary device for determining the Zn permeability. The permeameter 40 illustrated in FIG. 2A includes a sample holder 42 for holding the dense membrane in the device, a first vessel 44 provided at one side of the sample holder 42, and a second vessel 46 provided at the other side of the sample holder 42. The first vessel 44 contains a first aqueous solution 48 containing Zn such that one surface of the dense membrane comes into contact with the first aqueous solution 48, whereas the second vessel 46 contains a second aqueous solution 50 not containing Zn such that the other surface of the dense membrane comes into contact with the second aqueous solution 50. Thus, the first aqueous solution 48 contained in the first vessel 44 is completely separated from the second aqueous solution 50 contained in the second vessel 46 by the dense membrane held in the sample holder 42. This configuration achieves reliable and highly accurate evaluation of the degree of permeation of Zn from the first aqueous solution 48 through the dense membrane into the second aqueous solution 50.

Figure 2B:
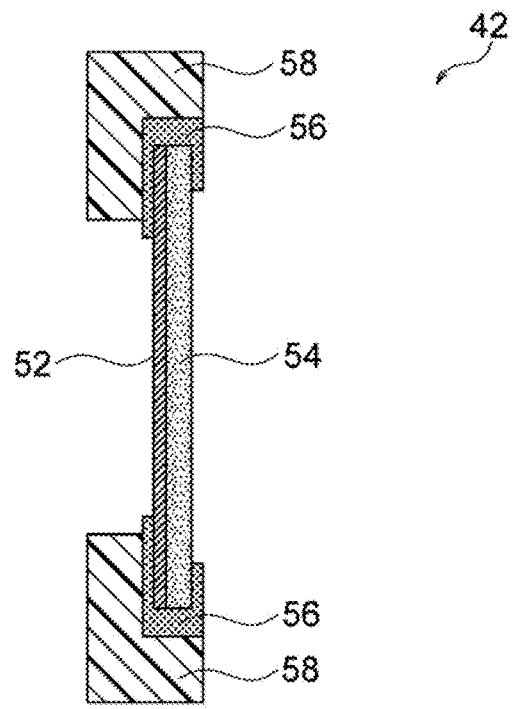
FIG. 2B is a schematic cross-sectional view of a sample holder used in the device illustrated in FIG. 2A.

The dense membrane is held in the permeameter 40 (particularly in the sample holder 42) before the permeation of Zn. FIG. 2B illustrates an example of the sample holder 42. The sample holder 42 illustrated in FIG. 2B includes a jig 58 having a central opening and disposed along the periphery of the dense membrane 52 with an adhesive 56. The dense membrane 52 is preferably provided in the form of a composite material; i.e., disposed on a porous substrate 54. As illustrated in FIG. 2A, sealing members (e.g., packings) 60a and 60b are disposed on the opposite surfaces of the jig 58, and flanges 62a and 62b are respectively disposed on the sealing members 60a and 60b. The flange 62a is preferably combined with the first vessel 44. Similarly, the flange 62b is preferably combined with the second vessel 46. If the dense membrane 52 is disposed on the porous substrate 54, in the form of a composite material, the dense membrane 52 is preferably disposed so as to come into contact with the first aqueous solution 48 containing Zn in view of more reliable evaluation of the Zn permeability. The paired flanges 62a and 62b are preferably fastened to each other with fasteners (e.g., screws) 64 so as to prevent leakage of the liquid. This configuration facilitates the assembly and disassembly of the sample holder, and thus achieves efficient evaluation of the Zn permeabilities of many dense membranes.

The first aqueous solution 48 is preferably an aqueous alkali metal hydroxide solution. The aqueous alkali metal hydroxide solution preferably contains ZnO dissolved therein. The second aqueous solution 50 is preferably an aqueous alkali metal hydroxide solution not containing ZnO. The second aqueous solution 50 is more preferably an aqueous alkali metal hydroxide solution free from ZnO and containing the same alkali metal hydroxide at the same concentration as in the first aqueous solution 48. The alkali metal hydroxide is preferably potassium hydroxide. An aqueous alkali metal hydroxide solution, such as an aqueous potassium hydroxide solution, is atypical electrolytic solution used in an alkaline battery, such as a zinc secondary battery. The use of an aqueous solution having a composition close or equivalent to that of such an electrolytic solution achieves highly accurate evaluation of the Zn permeability under conditions close or equivalent to those under which a separator for a battery (in particular, a separator for a zinc secondary battery) is used. Both of the first and second aqueous solutions, which are aqueous alkali metal hydroxide solutions, preferably contain an Al-containing compound, and more preferably contain the compound at the same concentration. The contact of the LDH dense membrane with an aqueous alkali metal hydroxide solution (e.g., an aqueous potassium hydroxide solution) may lead to dissolution of Al (i.e., a typical element contained in LDH) in the aqueous solution, resulting in degradation of the dense membrane. The addition of an Al-containing compound to the first and second aqueous solutions can prevent such dissolution of Al and thus degradation of the dense membrane. Al dissolved in the electrolytic solution may be in any form, such as metal ion, hydroxide, and/or hydroxy complex. Examples of the form of dissolved Al include $Al^{3+}$, $Al(OH)^{2+}$, $Al(OH)_2^+$, $Al(OH)_3^0$, $Al(OH)_4^-$, and $Al(OH)_5^{2-}$. Preferred examples of the Al-containing compound include aluminum hydroxide, γ-alumina, α-alumina, boehmite, diaspore, hydrotalcite, and any combination of them. The Al-containing compound is more preferably aluminum hydroxide and/or γ-alumina, most preferably aluminum hydroxide. The Al-containing compound is added to the first and second aqueous solutions so as to achieve an Al concentration of preferably 0.001 mol/L or more, more preferably 0.01 mol/L or more, still more preferably 0.1 mol/L or more, particularly preferably 1.0 mol/L or more, most preferably 2.0 mol/L or more, more than 3.0 mol/L, or 3.3 mol/L or more. The upper limit of the Al concentration of the electrolytic solution may be any value and may be the saturated solubility of the Al compound. For example, the Al concentration of the electrolytic solution is 20 mol/L or less or 10 mol/L or less.

As described above, the hydroxide-ion-conductive dense membrane may be any dense membrane exhibiting hydroxide ion conductivity; for example, a membrane containing an inorganic and/or organic material exhibiting hydroxide ion conductivity. The inorganic material exhibiting hydroxide ion conductivity preferably contains a layered double hydroxide represented by the formula: $M^{2+}_{1-x}M^{3+}_x(OH)_2$ $A^{n-}_{x/n} \cdot mH_2O$ (wherein $M^{2+}$ represents a divalent cation, $M^{3+}$ represents a trivalent cation, $A^{n-}$ represents an n-valent anion, n represents an integer of 1 or more, x is 0.1 to 0.4, and m is 0 or more). Thus, the hydroxide-ion-conductive dense membrane is preferably a layered double hydroxide dense membrane; i.e., an LDH dense membrane (hereinafter referred to as "LDH membrane"). The hydroxide-ion-conductive dense membrane preferably exhibits water impermeability.

The LDH membrane contains a layered double hydroxide (LDH) represented by the formula: $M^{2+}_{1-x}M^{3+}_x(OH)_2A^{n-}_{x/n}\cdot mH_2O$ (wherein $M^{2+}$ represents a divalent cation, $M^{3+}$ represents a trivalent cation, $A^{n-}$ represents an n-valent anion, n is an integer of 1 or more, x is 0.1 to 0.4, and m is 0 or more). Preferably, the LDH membrane is primarily composed of the LDH. In the formula. $M^{2+}$ may represent any divalent cation, and preferably $Mg^{2+}$, $Ca^{2+}$ or $Zn^{2+}$, more preferably $Mg^{2+}$. $M^{3+}$ may represent any trivalent cation, and preferably $Al^{3+}$ or $Cr^{3+}$, more preferably $Al^{3+}$. $A^{n-}$ may represent any anion, and preferably $OH^-$ or $CO_3^{2-}$. In the formula, preferably. $M^{2+}$ comprises $Mg^{2+}$, $M^{3+}$ comprises $Al^{3+}$, and $A^{n-}$ comprises $OH^-$ and/or $CO_3^{2-}$. In the formula, n is an integer of 1 or more, preferably 1 or 2; x is 0.1 to 0.4, preferably 0.2 to 0.35; and m is 0 or more, and typically a real or integer number exceeding 0 or not less than 1.

Figure 3:
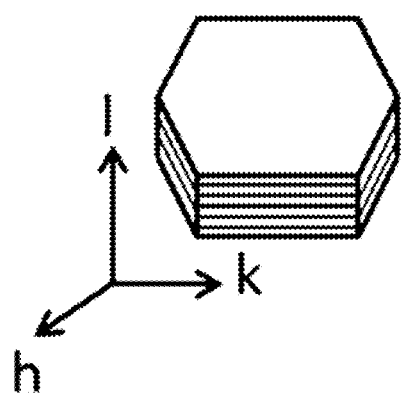
FIG. 3 is a schematic illustration of a platy particle of layered double hydroxide (LDH).

The layered double hydroxide contained in the LDH membrane is composed of an agglomeration of platy particles (i.e., platy LDH particles). Preferably, these platy particles are oriented such that the tabular faces of the platy particles are substantially perpendicular to or oblique to the surface of the porous substrate (i.e., the substrate surface). As illustrated in FIG. 3, the LDH crystal is in the form of a platy particle with a layered structure. The substantially perpendicular or oblique orientation described above is significantly beneficial for the LDH membrane, because an oriented LDH membrane exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the present inventors have revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH membrane fully or significantly leads to the anisotropic hydroxide ion conductivity of the oriented LDH to the thickness direction of the layer (i.e., the direction perpendicular to the surface of the LDH membrane or the surface of the porous substrate), whereby the conductivity in the thickness direction can be maximally or significantly increased. In addition, the LDH membrane has a layered structure and thus exhibits lower resistance than an LDH bulk block. The LDH membrane having such an orientation readily conducts hydroxide ions in the thickness direction of the layer. Because of its high density, the LDH membrane is very suitable for use in a functional membrane that is desired to have high conductivity across the thickness of the layer and high density, such as a separator for a battery (e.g., a hydroxide-ion-conductive separator for a zinc-air battery).

In a particularly preferred embodiment, the LDH membrane is composed of the platy LDH particles highly oriented in the substantially perpendicular direction. If the platy LDH particles are highly orientated in the substantially perpendicular direction, the X-ray diffractometry of the surface of the LDH membrane shows substantially no peak of (003) plane or a peak of (003) plane smaller than that of (012) plane (note: this shall not apply to the case where the porous substrate shows a peak at the same angle as the peak of (012) plane of the platy LDH particles, because the peak of (012) plane of the platy LDH particles cannot be specified). This characteristic peak profile indicates that the platy LDH particles of the LDH membrane are oriented substantially perpendicular to (i.e., perpendicular to or nearly perpendicular to, and preferably perpendicular to) the LDH membrane. The peak of (003) plane is strongest among peaks observed by X-ray diffractometry of non-oriented LDH powder. In contrast, the oriented LDH membrane shows substantially no peak of (003) plane or the peak of (003) plane smaller than the peak of (012) plane because platy LDH particles are oriented substantially perpendicular to the LDH membrane. The reason for this is as follows: The c planes (00l) including the (003) plane (where l is 3 or 6) are parallel to the layers of platy LDH particles. If the platy LDH particles are oriented substantially perpendicular to the LDH membrane, the layers of platy LDH particles are also substantially perpendicular to the LDH membrane and thus the X-ray diffractometry of the surface of the LDH membrane shows no peak or very small peak of (00l) plane (where l is 3 or 6). The peak of (003) plane, if present, tends to be stronger than the peak of (006) plane, and the use of the peak of (003) plane facilitates determination of the substantially perpendicular orientation as compared with the use of the peak of (006) plane. Thus, the oriented LDH membrane preferably shows substantially no peak of (003) plane or shows the peak of (003) plane smaller than the peak of (012) plane, which indicates that the highly perpendicular orientation is achieved. In contrast, the oriented LDH membranes disclosed in Patent Documents 1 and 2 and Non-Patent Document 1 each show a strong peak of (003) plane, which indicates that the substantially perpendicular orientation is not satisfactorily achieved. In addition, these oriented LDH membranes do not have high density.

The hydroxide-ion-conductive dense membrane (preferably LDH membrane) has a thickness of preferably 100 μm or less, more preferably 75 μm or less, still more preferably 50 μm or less, particularly preferably 25 μm or less, most preferably 5 μm or less. Such a small thickness leads to a reduction in resistance of the dense membrane. The dense membrane having the above thickness exhibits a low resistance suitable for use in, for example, a battery. The lower limit of the thickness of the dense membrane, which may vary with the intended use of the membrane, may be any value. In order to ensure the hardness desirable for use in a functional membrane, such as a separator, the thickness is preferably 1 μm or more, more preferably 2 μm or more.

At least one surface of the hydroxide-ion-conductive dense membrane (preferably LDH membrane) may have a non-flat structure. This non-flat surface structure has many cavities and/or protrusions and thus achieves a very large surface area. Thus, the use of the dense membrane as a separator in an electrolytic solution leads to an increase in interfacial area between the dense membrane and the electrolytic solution, resulting in reduced interfacial resistance. The dense layered structure having such a surface structure and exhibiting hydroxide ion conductivity and water impermeability can function as an LDH separator exhibiting a low interfacial resistance with an electrolytic solution. The non-flat surface structure preferably contains acicular particles protruding from the dense membrane in a direction away from the dense membrane (typically substantially perpendicular to the dense membrane). The presence of the acicular particles can significantly increase the surface area of the dense membrane, resulting in an effective and significant reduction in interfacial resistance between the dense membrane and an electrolytic solution. The cross-sectional size of each acicular particle is preferably 0.01 to 0.5 μm, more preferably 0.01 to 0.3 μm. The height of each acicular particle is preferably 0.5 to 3.0 µm, more preferably 1 to 3 µm. As used herein, "the height of each acicular particle" refers to the height of a protruding portion of the particle as measured from the surface of the dense membrane. The non-flat surface structure also preferably contains porous coarse particles having high porosity. The presence of the porous coarse particles can significantly increase the surface area of the dense membrane, resulting in an effective reduction in interfacial resistance between the dense membrane and an electrolytic solution. In a particularly preferred embodiment, the porous coarse particles are agglomerates composed of entangled acicular or platy particles and having numerous pores. These agglomerates, which may be called spherical moss-like particles, exhibit the effect of increasing the surface area of the dense membrane. The porous coarse particles each have a diameter of preferably 0.5 to 30 µm, more preferably 0.5 to 20 µm, as measured in a direction parallel to the dense membrane. The height of each porous coarse particle is preferably 0.5 to 30 µm, more preferably 1 to 30 µm. As used herein, "the height of each porous coarse particle" refers to the height of a protruding portion of the particle as measured from the surface of the dense membrane. The non-flat surface structure also preferably contains both acicular particles and porous coarse particles.

Composite Material

The dense membrane (preferably LDH membrane) is preferably disposed on at least one surface of a porous substrate. In a preferred embodiment, the present invention provides a composite material comprising a porous substrate and the hydroxide-ion-conductive dense membrane disposed on at least one surface of the porous substrate. As used herein, "the surface of a porous substrate" generally refers to the outermost surface of the porous substrate, which has a platy shape under macroscopic observation of the substrate, and may also refer to the surfaces of pores present near the outermost surface of the platy porous substrate under microscopic observation of the substrate.

The porous substrate is preferably one on which the LDH membrane can be formed. The porous substrate may be composed of any material and may have any porous structure. In a typical embodiment, the LDH membrane is formed on the surface of the porous substrate. Alternatively, the LDH membrane may be formed on a non-porous substrate, and then the non-porous substrate may be modified into a porous form by any known process. The porous substrate preferably has a water-permeable porous structure because such a porous structure enables an electrolytic solution to come into contact with the LDH membrane in the case of the use of the composite material as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina, zirconia (e.g., yttria-stabilized zirconia (YSZ)), and any combination thereof. The use of such a porous ceramic material facilitates the formation of a high-density LDH membrane. Preferred examples of the metal material include aluminum and zinc. Preferred examples of the polymer material include polystyrene, polyether sulfone, polypropylene, epoxy resins, poly(phenylene sulfide), hydrophilized fluororesins (e.g., poly(tetrafluoroethylene) (PTFE)), and any combination thereof. Each of the preferred materials described above has alkali resistance; i.e., resistance to an electrolytic solution of a battery.

The porous substrate has an average pore size of preferably 0.001 to 1.5 µm, more preferably 0.001 to 1.25 µm, still more preferably 0.001 to 1.0 µm, particularly preferably 0.001 to 0.75 µm, most preferably 0.001 to 0.5 µm. Such a preferred range ensures desired water permeability in the porous substrate and leads to formation of a dense LDH membrane exhibiting water impermeability (preferably both water impermeability and gas impermeability). As used herein, the term "water impermeability" indicates that water in contact with one surface of an analyte (i.e., the LDH membrane and/or the porous substrate) does not reach the other surface during the "density evaluation test" performed in Example B5 described below or any other equivalent method or system. In the present invention, the average pore size can be determined by measuring the largest length of each pore in an electron microscopic image of the surface of the porous substrate. The magnification of the electron microscopic image used in this measurement is 20,000 or more. All the measured pore sizes were listed in order of size to calculate the average, from which the subsequent 15 larger sizes and the subsequent 15 smaller sizes, i.e., 30 sizes in total, were selected in one field of view. The selected sizes of two fields of view are then averaged to yield the average pore size. The pore sizes can be measured by, for example, a length-measuring function of an electron microscope or image analysis software (e.g., Photoshop manufactured by Adobe).

The surface of the porous substrate has a porosity of preferably 10 to 60%, more preferably 15 to 55%, still more preferably 20 to 50%. Such a preferred range ensures desired water permeability in the porous substrate and leads to formation of a dense LDH membrane exhibiting water impermeability (preferably both water impermeability and gas impermeability). The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity of the surface of the porous substrate can be measured by a method involving image processing as follows: 1) an electron microscopic image of the surface of the porous substrate is taken at a magnification of 10,000 or more; 2) the grayscale electron microscopic image is read with image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the porous substrate by image processing. More preferably, the porosities in three 6 µm×6 µm areas selected at random are averaged for objective evaluation.

Production of LDH Membrane and LDH-Containing Composite Material

The LDH membrane or LDH-containing composite material of the present invention is preferably produced through a method involving (a) providing a porous substrate, (b) evenly depositing a material for generating a species from which LDH crystal growth starts (i.e., a material for starting crystal growth) on the porous substrate if needed, and (c) hydrothermally treating the porous substrate to form an LDH membrane.

(a) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina, zirconia (e.g., yttria-stabilized zirconia (YSZ)), and any combination thereof. The use of such a porous ceramic material tends to improve the density of a LDH membrane. In the case of a ceramic porous substrate, the porous substrate is preferably subjected to, for example, ultrasonic cleaning or cleaning with ion-exchange water.

As described above, the porous substrate is more preferably composed of a ceramic material. The ceramic porous substrate may be a commercially available one or may be prepared by any known process. For example, the ceramic porous substrate may be prepared as follows: Ceramic powder (e.g., zirconia powder, boehmite powder, or titania powder), methyl cellulose, and ion-exchange water are mixed in predetermined proportions; the resultant mixture is subjected to extrusion molding; the molded product is dried at 70 to 200° C. for 10 to 40 hours; and the dried product is fired at 900 to 1,300° C. for one to five hours. The amount of methyl cellulose is preferably 1 to 20 parts by weight relative to 100 parts by weight of the ceramic powder. The amount of ion-exchange water is preferably 10 to 100 parts by weight relative to 100 parts by weight of the ceramic powder.

(b) Deposition of Material for Starting Crystal Growth

If needed, a material for generating a species from which LDH crystal growth starts may be evenly deposited on the porous substrate. The even deposition of such a material on the surface of the porous substrate and the subsequent step (c) can form a highly-densified LDH membrane evenly on the porous substrate. Preferred examples of the species from which LDH crystal growth starts include chemical species generating an anion that can enter between layers of LDH, chemical species generating a cation that can constitute LDH, and LDHs.

(i) Anion-Generating Chemical Species

The LDH crystal growth may start from a chemical species generating an anion that can enter between LDH layers. Examples of the anion include $CO_3^{2-}$, $OH^-$, $SO_3^-$, $SO_3^{2-}$ $SO_4^{2-}$ $NO_3^-$, $Cl^-$, $Br^-$, and any combination thereof. A material for generating such a species may be evenly deposited on the surface of the porous substrate by a process suitable for the material. The deposition of such an anion-generating chemical species on the surface of the porous substrate leads to adsorption of a metal cation (e.g., $Mg^{2+}$ or $Al^{3+}$) on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate after the deposition of a polymer on the surface of the porous substrate and subsequent introduction of an anion-generating chemical species into the polymer. In this embodiment, the anion is preferably $SO_3^-$. $SO_3^{2-}$, and/or $SO_4^{2-}$. Such an anion-generating chemical species is preferably introduced into the polymer through sulfonation. The polymer may be an anionizable (in particular, sulfonatable) polymer. Examples of such a polymer include polystyrene, polyether sulfone, polypropylene, epoxy resins, poly(phenylene sulfide), and any combination thereof. Aromatic polymers are particularly preferred because they are readily anionized (in particular, sulfonated). Examples of the aromatic polymers include polystyrene, polyether sulfone, epoxy resins, poly(phenylene sulfide), and any combination thereof. Most preferred is polystyrene. The deposition of the polymer on the porous substrate preferably involves application of a polymer solution to the surface of the porous substrate (preferably, to particles forming the outermost surface of the platy porous substrate). The polymer solution can be readily prepared by, for example, dissolution of a solid polymer (e.g., a polystyrene substrate) in an organic solvent (e.g., xylene). In view of even application of the polymer solution, the solution is preferably applied to the porous substrate such that the solution does not permeate the substrate. Thus, spin coating is preferred for very even deposition or application of the polymer solution. The spin coating may be performed under any conditions; for example, a rotation speed of 1,000 to 10,000 rpm and an operational period of about 60 to 300 seconds (involving dropwise addition and drying). The sulfonation may be performed by immersing the polymer-deposited porous substrate in an acid for sulfonating the polymer, such as sulfuric acid (e.g., concentrated sulfuric acid), fuming sulfuric acid, chlorosulfonic acid, and sulfuric anhydride. Any other sulfonation techniques may also be used. The porous substrate may be immersed in such a sulfonating acid at room temperature or a high temperature (e.g., 50 to 150° C.) for any period of time (e.g., 1 to 14 days).

In another preferred embodiment of the present invention, the material for starting crystal growth may be deposited on the porous substrate by treatment of the surface of the substrate with a surfactant containing an anion-generating chemical species as a hydrophilic moiety. In this embodiment, the anion is preferably $SO_3^-$, $SO_3^{2-}$, and/or $SO_4^{2-}$. Typical examples of such a surfactant include anionic surfactants. Preferred examples of the anionic surfactant include sulfonate anionic surfactants, sulfate anionic surfactants, and any combination thereof. Examples of the sulfonate anionic surfactants include (sodium naphthalenesulfonate)-formalin condensate, disodium polyoxyethylene alkyl sulfosuccinate, poly(sodium styrenesulfonate), sodium dioctyl sulfosuccinate, and polyoxyethylene lauryl ether sulfate triethanolamine. Examples of the sulfate anionic surfactants include sodium polyoxyethylene lauryl ether sulfate. The porous substrate may be treated with a surfactant by any process that can deposit the surfactant on the surface of the substrate; for example, application of a surfactant-containing solution to the porous substrate, or immersion of the porous substrate in a surfactant-containing solution. The porous substrate may be immersed in the surfactant-containing solution with agitation of the solution at room temperature or a high temperature (e.g., 40 to 80° C.) for any period of time (e.g., one to seven days).

(ii) Cation-Generating Chemical Species

The LDH crystal growth may start from a chemical species generating a cation that can constitute the layered double hydroxide. Such a cation is preferably $Al^{3+}$, for example. In this case, the material for starting crystal growth is preferably at least one aluminum compound selected from the group consisting of oxides, hydroxides, oxyhydroxides, and hydroxy complexes of aluminum. A material for generating such a chemical species may be evenly deposited on the surface of the porous substrate by a process suitable for the material. The deposition of such a cation-generating chemical species on the surface of the porous substrate leads to adsorption of an anion that can enter between layers of LDH on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate by application of a sol containing an aluminum compound to the porous substrate. Preferred examples of the aluminum compound include boehmite (AlOOH), aluminum hydroxide (Al(OH)$_3$), and amorphous alumina. Most preferred is boehmite. Spin coating is preferably used for very even application of the sol containing the aluminum compound. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by hydrothermal treatment of the porous substrate in an aqueous solution containing at least aluminum to form an aluminum compound on the surface of the porous substrate. The aluminum compound to be formed on the surface of the porous substrate is preferably Al(OH)$_3$. The LDH membrane on the porous substrate (in particular, a ceramic porous substrate) tends to form crystalline and/or amorphous Al(OH)$_3$ at the initial growth stage. LDH growth may start from the Al(OH)$_3$ serving as a nucleus. Thus, the hydrothermal treatment step (c) after even deposition of Al(OH)$_3$ on the surface of the porous substrate by hydrothermal treatment can evenly form a highly-densified LDH membrane on the surface of the porous substrate. In this embodiment, steps (b) and (c) may be continuously performed in the same hermetic container, or may be sequentially performed in separate containers.

If steps (b) and (c) are continuously performed in the same hermetic container, an aqueous stock solution used in step (c) (i.e., an aqueous solution containing an element constituting LDH) may be used in step (b). In such a case, the hydrothermal treatment in step (b) is performed in a hermetic container (preferably an autoclave) in an acidic or neutral pH range (preferably at a pH of 5.5 to 7.0) at a relatively low temperature of 50 to 70° C., to promote nucleation of Al(OH)$_3$, instead of LDH. After the nucleation of Al(OH)$_3$, the aqueous stock solution is maintained at the nucleation temperature or heated from the temperature, to promote hydrolysis of urea, resulting in an increase in pH of the aqueous stock solution. Thus, step (b) is smoothly followed by step (c) in a pH range suitable for LDH growth (preferably a pH of more than 7.0).

If steps (b) and (c) are sequentially performed in separate containers, it is preferred that different aqueous stock solutions be used for steps (b) and (c). For example, step (b) preferably involves the use of an aqueous stock solution primarily containing an Al source (preferably, not containing a metal other than Al) for nucleation of Al(OH)$_3$. In this case, the hydrothermal treatment in step (b) may be performed at 50 to 120° C. in a hermetic container (preferably an autoclave) different from that used in step (c). Preferred examples of the aqueous stock solution primarily containing an Al source include an aqueous solution containing aluminum nitrate and urea but not containing a magnesium compound (e.g., magnesium nitrate). The use of the Mg-free aqueous stock solution can avoid precipitation of LDH, resulting in promotion of nucleation of Al(OH)$_3$.

In another preferred embodiment of the present invention, the material for starting crystal growth may be deposited on the porous substrate by vapor deposition of aluminum on the surface of the porous substrate and than conversion of the aluminum into an aluminum compound through hydrothermal treatment in an aqueous solution. The aluminum compound is preferably Al(OH)$_3$. In particular, the conversion of aluminum into Al(OH)$_3$ promotes LDH growth from the Al(OH)$_3$ serving as a nucleus. Thus, step (c) of hydrothermal treatment after even formation of Al(OH)$_3$ on the surface of the porous substrate by hydrothermal treatment can evenly form a highly-densified LDH membrane on the surface of the porous substrate. The vapor deposition of aluminum may involve physical or chemical vapor deposition, and preferably involves physical vapor deposition, such as vacuum deposition. The hydrothermal treatment for conversion of aluminum into Al(OH)$_3$ may use any aqueous solution containing a component that can react with the deposited Al to form Al(OH)$_3$.

(iii) LDH as Material for Starting Crystal Growth

The crystal growth may start from LDH. In this case. LDH growth may start form LDH serving as a nucleus. The even deposition of the LDH nucleus on the surface of the porous substrate and subsequent step (c) can form a highly-densified LDH membrane evenly on the porous substrate.

In a preferred embodiment of the present invention, the material for starting crystal growth may be deposited on the porous substrate by application of an LDH-containing sol to the surface of the porous substrate. The LDH-containing sol may be prepared by dispersion of LDH in a solvent, such as water. In this embodiment, spin coating is preferably used for very even application of the LDH-containing sol. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by vapor deposition of aluminum on the surface of the porous substrate and then conversion of the (vapor-deposited) aluminum into LDH through hydrothermal treatment in an aqueous solution containing an element constituting LDH other than aluminum. The vapor deposition of aluminum may involve physical or chemical vapor deposition, and preferably involves physical vapor deposition, such as vacuum deposition. The hydrothermal treatment for conversion of aluminum into LDH may use an aqueous stock solution containing a component other than the vapor-deposited Al. Preferred examples of the aqueous stock solution include an aqueous stock solution primarily containing an Mg source. More preferred is an aqueous solution containing magnesium nitrate and urea but not containing an aluminum compound (e.g., aluminum nitrate). The use of the Mg source-containing aqueous solution results in nucleation of LDH together with the vapor-deposited Al.

(c) Hydrothermal Treatment

The porous substrate (on which the material for starting crystal growth may be deposited if needed) is hydrothermally treated in an aqueous stock solution containing the elements of LDH, to form the LDH membrane on the surface of the porous substrate. Preferably, the aqueous stock solution contains magnesium ions (Mg$^{2+}$) and aluminum ions (Al$^{3+}$) in a specific total concentration and further contains urea. Urea is hydrolyzed into ammonia and raises the pH of the aqueous stock solution (e.g., a pH of more than 7.0, preferably a pH of more than 7.0 and 8.5 or less), and metal ions co-existing in the aqueous stock solution form hydroxides, to produce LDH. The hydrolysis of urea, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, high-density LDH membrane. At a low total concentration of magnesium ions and aluminum ions, the crystal growth dominates over the nucleation, resulting in a decrease in number of LDH particles and an increase in size of the LDH particles. At a high total concentration, the nucleation dominates over the crystal growth, resulting in an increase in number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3^-$) in the aqueous stock solution is preferably 2 to 6, more preferably 4 to 5.

The porous substrate may be immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are substantially perpendicular to or oblique to the surface of the porous substrate).

The porous substrate is hydrothermally treated in the aqueous stock solution to form the LDH membrane on the surface of the porous substrate. The hydrothermal treatment is performed in a hermetic container (preferably an autoclave) at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH membrane produced as described above is composed of densely assembled platy LDH particles that are oriented in the substantially perpendicular direction, which is beneficial for the conductivity. The LDH membrane typically exhibits water impermeability (preferably both water impermeability and gas impermeability) because of its high density. The LDH membrane is typically composed of an agglomeration of platy particles, and these platy particles are oriented such that the tabular faces of the platy particles are substantially perpendicular to or oblique to the surface of the porous substrate. Thus, the use of the dense LDH membrane having sufficient gas-tight properties in batteries (e.g., zinc-air batteries) will lead to an improvement in electricity generating capacity. Furthermore, the dense LDH membrane is expected to be used in novel applications, such as a separator that can prevent growth of dendritic zinc and permeation of carbon dioxide, which have been large technical barriers against forming a zinc-air secondary battery containing an electrolytic solution that has not been achieved. The dense LDH membrane can also be used in a separator for a nickel-zinc battery that has suffered from growth of dendritic zinc which is an obstacle to practical use of this battery.

The above-described method may form LDH membranes on the two surfaces of the porous substrate. Thus, in order to modify the LDH-containing composite material into a form suitable for use as a separator, the LDH membrane on one surface of the porous substrate is preferably removed through mechanical polishing after the formation of the LDH membranes. Alternatively, it is desirable to take a measure to prevent formation of the LDH membrane on one surface of the porous substrate.

EXAMPLES

The present invention will now be described in more detail by way of Examples.

Example A1

In this example, samples A1 to A10; i.e., samples of layered double hydroxide (LDH)-containing composite material were prepared by formation of an LDH membrane on a porous substrate.

(1) Preparation of Porous Substrate

Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at 1,150° C. for three hours, to prepare an alumina porous substrate.

Figure 4:
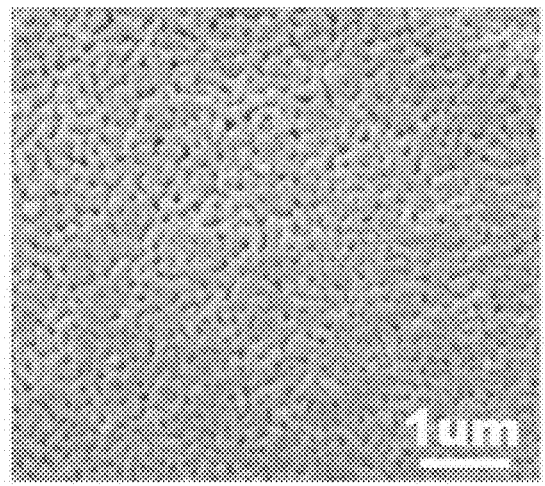
FIG. 4 is a SEM image of the surface of a porous alumina substrate prepared in Example A1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 4 illustrates the SEM image of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Spin-Coating with Polystyrene and Sulfonation

For samples A1 to A6, each porous substrate was spin-coated with polystyrene and sulfonated through the following procedure. Specifically, a polystyrene substrate (0.6 g) was dissolved in xylene (10 mL) to prepare a coating solution having a polystyrene concentration of 0.06 g/mL. The coating solution (0.1 mL) was added dropwise and applied to the porous substrate by a spin coating process at 8,000 rpm for 200 seconds (including dropwise addition and drying). The spin-coated porous substrate was sulfonated through immersion in 95% sulfuric acid at 25° C. for four days.

(4) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate $(A)(NO_3)_3 \cdot 9H_2O$, manufactured by KANTO CHEMICAL Co., Inc.), and urea $((NH_2)_2CO_3$ manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(5) Formation of Membrane by Hydrothermal Treatment

The aqueous stock solution prepared in the above procedure (4) and the porous substrate sulfonated in the above procedure (3) (for samples A1 to A6) or the porous substrate cleaned in the above procedure (2) (for samples A7 to A10) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70 to 75° C. for 168 to 504 hours, to form oriented layered double hydroxide membranes on the surfaces of the substrate. Ten types of oriented membranes with different densities were prepared under appropriately selected conditions for the hydrothermal treatment. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.0 to 2.0 μm. LDH-containing composite material samples (hereinafter referred to as "composite material samples") were thereby prepared (samples A1 to A10). LDH membranes were formed on the opposite surfaces of the porous substrate. In order to use the composite material as a separator, the LDH membrane on one surface of the porous substrate was mechanically removed.

Example A2

Identification of Membrane Sample

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile was compared with the diffraction peaks of a layered double hydroxide (or a hydrotalcite compound) described in JCPDS card No. 35-0964 for identification of the membrane sample. Each of membrane samples A1 to A10 was identified as a layered double hydroxide (LDH, or a hydrotalcite compound).

Example A3

Determination of He Permeability

The He permeabilities of membrane samples A1 to A10 were determined for evaluating the densities of these samples as follows. A He permeameter system 10 was provided as illustrated in FIGS. 1A and 1B. In the He permeameter system 10. He gas was fed from a He gas cylinder to a sample holder 16 through a pressure gauge 12 and a flowmeter 14 (digital flowmeter) and then fed to one surface of a dense membrane 18 held by the sample holder 16, so that the He gas permeated the dense membrane 18 end exited through the other surface.

The sample holder 16 including a gas inlet 16a, a hermetic space 16b, and a gas outlet 16c was assembled as follows. The dense membrane 18 was attached to a jig 24 (composed of ABS resin) having a central opening with an adhesive 22 applied to the periphery of the dense membrane 18. Sealing members (butyl rubber packings) 26a and 26b were respectively disposed on the upper and lower surfaces of the jig 24, and support members having openings (flanges) 28a and 28b composed of PTFE were respectively disposed on the sealing members 26a and 26b. Thus, the hermetic space 16b was defined by the dense membrane 18, the jig 24; the sealing member 26a, and the support member 28a. The dense membrane 18 was provided in the form of a composite material; i.e., the dense membrane 18 was disposed on the porous substrate 20 so as to face the gas inlet 16a.

The support members 28a and 28b were fixed to each other with fasteners (screws) 30 so as to prevent leakage of He gas through sites other than the gas outlet 16c. A gas feeding tube 34 was connected to the gas inlet 16a of the sample holder 16 with a joint 32.

Subsequently, He gas was fed to the He permeameter system 10 through the gas feeding tube 34 so that the He gas permeated the dense membrane 18 held in the sample holder 16. The pressure and flow rate of the gas fed were monitored with the pressure gauge 12 and the flowmeter 14. The He permeability was calculated after the permeation of He gas for 1 to 30 minutes. The He permeability was calculated by the expression F/(P×S) where F represents the amount of He gas permeated per unit time ($cm^3$/min), P represents a differential pressure (atm) applied to the dense membrane during permeation of He gas, and S represents the area ($cm^2$) of the membrane through which He gas permeates. The amount F of He gas permeated ($cm^3$/min) was read directly from the flowmeter 14. The differential pressure P was a gauge pressure read from the pressure gauge 12. He gas was fed so as to achieve a differential pressure P of 0.05 to 0.90 atm. The results are shown in Table 1 and FIG. 5.

Example A4

Determination of Zn Permeability

The Zn permeabilities of membrane samples A1 to A10 were determined for evaluating the densities of these samples as follows. A Zn permeameter 40 was provided as illustrated in FIGS. 2A and 2B. In the Zn permeameter 40, a first vessel 44 composed of an L-shaped PTFE tube and combined with a flange 62a and a second vessel 46 composed of an L-shaped PTFE tube and combined with a flange 62b were disposed such that the flanges 62a and 62b faced each other. A sample holder 42 was disposed between the flanges 62a and 62b so that Zn might permeate the dense membrane held by the sample holder 42.

The sample holder 42 was assembled and attached to the permeameter 40 as follows. The dense membrane 52 was attached to a jig 58 (composed of ABS resin) having a central opening with an adhesive 56 applied to the periphery of the dense membrane 52. As illustrated in FIG. 1A, sealing members (e.g., silicone rubber packings) 60a and 60b were disposed on the opposite surfaces of the jig 58, and the paired flanges 62a and 62b were respectively disposed on the sealing members 60a and 60b. The dense membrane 52, which was provided on the porous substrate 54 (i.e., in the form of a composite material), was disposed so as to face the first vessel 44 (into which a first aqueous solution 48 containing Zn was to be injected). The flanges 62a and 62b were fastened to each other with fasteners (screws) 64 so as to prevent leakage of the liquid between the flanges 62a and 62b.

The first aqueous solution 48 for the first vessel 44 was a 9 mol/L aqueous KOH solution containing $Al(OH)_3$ (2.5 mol/L) and ZnO (0.5 mol/L). The Zn concentration $C_1$ (mol/L) of the first aqueous solution was measured by ICP atomic emission spectrometry. The results are shown in Table 1. The second aqueous solution 50 for the second vessel 46 was a 9 mol/L aqueous KOH solution containing $Al(OH)_3$ (2.5 mol/L) and not containing ZnO. In the permeameter 40 including the sample holder 42, the first aqueous solution 48 and the second aqueous solution 50 were respectively injected into the first vessel 44 and the second vessel 46 for permeation of Zn through the dense membrane 52 held by the sample holder 42. Thereafter, Zn was caused to permeate the dense membrane for a period of time t shown in Table 1. The volume $V_2$ (mL) of the second aqueous solution was then measured, and the Zn concentration $C_2$ (mol/L) of the second aqueous solution 50 was measured by ICP atomic emission spectrometry. The resultant data were used to calculate Zn permeability. The Zn permeability was calculated by the expression $(C_2 \times V_2)/(C_1 \times V_1 \times t \times S)$ where $C_1$ represents the Zn concentration (mol/L) of the first aqueous solution before the permeation of Zn, $V_1$ represents the volume (mL) of the first aqueous solution before the permeation of Zn. $C_u$ represents the Zn concentration (mol/L) of the second aqueous solution after the permeation of Zn, $V_2$ represents the volume (mL) of the second aqueous solution after the permeation of Zn, t represents the permeation time (min) of Zn, and S represents the area ($cm^2$) of the membrane through which Zn permeates. The results are shown in Table 1 and FIG. 5.

TABLE 1

| | Determination of He permeability | | | | Determination of Zn permeability | | | | |
|---|---|---|---|---|---|---|---|---|---|
| Sample No. | Sample Area of membrane S $cm^2$ | Differential pressure P atm | Amount of permeated He F $cm^3$/min | He permeability cm/min · atm | Time t h | Zn concentration of first aqueous solution before permeation of Zn $C_1$ mol/L | Volume of first aqueous solution before permeation of Zn $V_1$ mL | Zn concentration of second aqueous solution after permeation of Zn $C_2$ mol/L | Volume of second aqueous solution after permeation of Zn $V_2$ mL | Zn permeability $m^{-2} \cdot h^{-1}$ |
| A1 | 1.52 | 0.16 | 0.03 | 0.1 | 24 | 0.35 | 6.5 | 0.00029 | 6.2 | 0.22 |
| A2 | 0.07 | 0.94 | 0.05 | 0.8 | 168 | 0.44 | 6.5 | 0.00041 | 4.6 | 0.58 |
| A3 | 1.77 | 0.16 | 0.17 | 0.6 | 24 | 0.35 | 6.8 | 0.0031 | 6.8 | 2.1 |
| A4 | 1.88 | 0.15 | 0.40 | 1.4 | 22 | 0.35 | 7.3 | 0.0046 | 7.3 | 3.2 |
| A5 | 1.57 | 0.16 | 0.77 | 3.1 | 22 | 0.43 | 6.9 | 0.0046 | 6.9 | 3.1 |
| A6 | 1.45 | 0.16 | 2.32 | 10 | 22 | 0.43 | 6.8 | 0.0046 | 6.9 | 3.4 |
| A7* | 1.63 | 0.15 | 4.08 | 17 | 24 | 0.35 | 7.2 | 0.047 | 5.0 | 24 |
| A8* | 1.71 | 0.17 | 12.2 | 42 | 23 | 0.42 | 7.0 | 0.076 | 5.2 | 34 |
| A9* | 1.86 | 0.16 | 26.5 | 89 | 23 | 0.42 | 7.3 | 0.070 | 6.9 | 37 |
| A10* | 1.95 | 0.17 | 84.6 | 260 | 26 | 0.42 | 6.8 | 0.090 | 6.5 | 40 |

*indicates comparative sample

Examples B1 to B5

In Reference Examples described below, an LDH dense membrane was formed on different porous substrates, but He and Zn permeabilities were not evaluated.

Example B1

(1) Preparation of Porous Substrate
<Samples B1 to B3>

Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at a temperature shown in Table 2 for three hours, to prepare an alumina porous substrate. Thereafter, the alumina porous substrate was shaped into a size of 2 cm×2 cm×0.3 cm.

<Samples B4 and B5>

Zirconia (TZ-3Y8 (for Sample B4) or TZ-8YS (for Sample B5), manufactured by TOSOH Corporation), methyl cellulose, and ion-exchange water were weighed in proportions by mass of 10:1:5, and then were kneaded together. The kneaded product was subjected to extrusion molding with a hand press into a size of 2.5 cm×10 cm×0.5 cm in thickness. The resultant green body was dried at 80° C. for 12 hours and then fired at a temperature shown in Table 2 for three hours, to prepare a zirconia porous substrate. Thereafter, the zirconia porous substrate was shaped into a size of 2 cm×2 cm×0.3 cm.

The porosity at the surface of each of the resultant porous substrates was determined by a method involving image processing. The results are shown in Table 2. Specifically, the porosity was determined as follows: 1) an electron microscopic image of the surface microstructure of the porous substrate was taken with a field emission scanning electron microscope (FE-SEM) for sample B1 or a scanning electron microscope (SEM; JSM-6610LV, manufactured by JEOL Ltd.) for samples B2 to B5 at a magnification of 10,000 or more (for samples B2 to 85) or 100,000 (for sample B1) at an acceleration voltage of 1 kV (for sample B1) or 10 to 20 kV (for sample B2 to B5); 2) the grayscale electron microscopic image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 600 nm×600 nm area of the surface of the porous substrate (for sample B1) or a 6 μm×6 μm area of the surface of the porous substrate (for samples B2 to B5).

The average pore size of each porous substrate was determined. The results are shown in Table 2. In the present invention, the average pore size was determined by measuring the largest length of each pore in an electron microscopic (FE-SEM or SEM) image of the surface of the porous substrate. The magnification of the electron microscopic (FE-SEM or SEM) image used in this measurement was 100,000 (for sample B1) or 20,000 (for samples B2 to B5). All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of FE-SEM or SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane samples B1 to B5"). The thickness of the membrane sample was about 1.5 μm. Layered-double-hydroxide-containing composite material samples (hereinafter referred to as "composite material samples B1 to B5") were thereby prepared. LDH membranes were formed on the opposite surfaces of the porous substrate. In order to use the composite material as a separator, the LDH membrane on one surface of the porous substrate was mechanically removed.

Example B2

Identification of Membrane Sample

Figure 6:
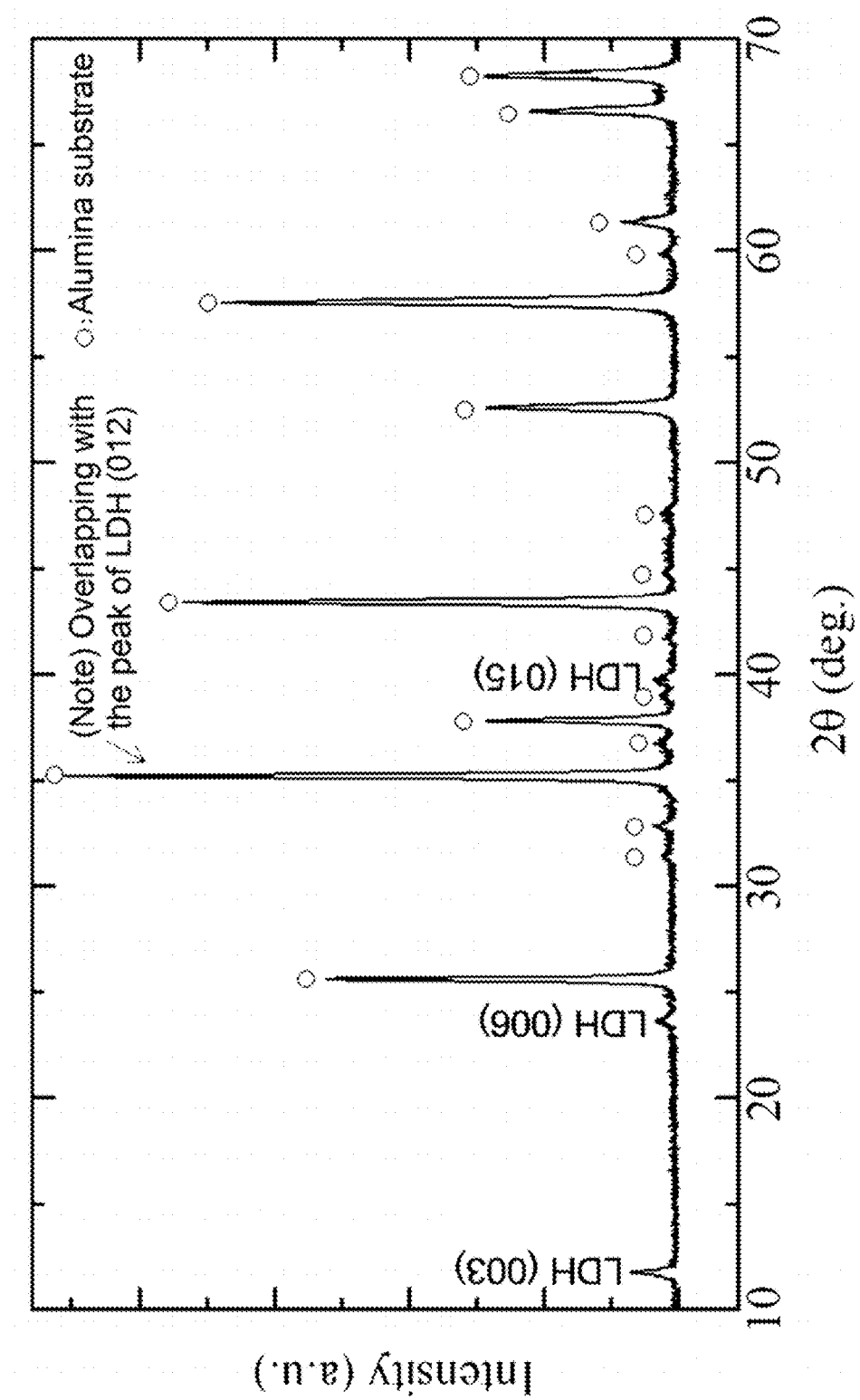
FIG. 6 is an XRD profile of a crystalline phase of a sample in Example B2.

A crystalline phase of membrane sample B2 was analyzed with an X-ray diffractometer (RINT-TTR III, manufactured by Rigaku Corporation) at a voltage of 50 kV, a current of 300 mA, and a measuring range of 10° to 70°. The resultant XRD profile is shown in FIG. 6. This XRD profile was compared with the diffraction peaks of a layered double hydroxide (or a hydrotalcite compound) described in JCPDS card No. 35-0964, and membrane sample B2 was identified as a layered double hydroxide (LDH, or a hydrotalcite compound). As shown in the XRD profile of FIG. 6, peaks derived from alumina in the porous substrate on which membrane sample B2 was formed (i.e., the peaks marked with a circle in FIG. 6) were also observed. Membrane samples B1 and B3 to B5 were also identified as a layered double hydroxide (LDH, or a hydrotalcite compound).

Example B3

Observation of Microstructure

Figure 7:
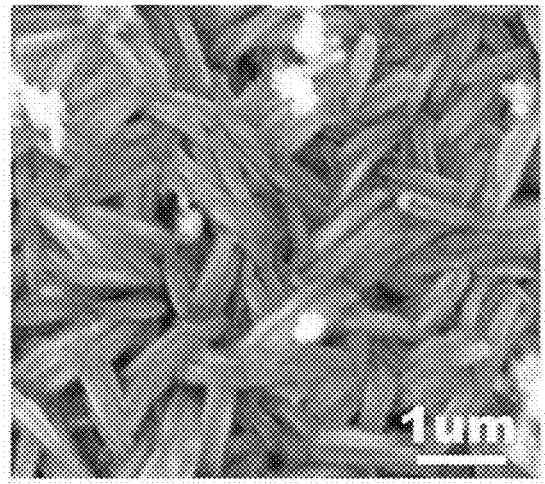
FIG. 7 is a SEM image of a surface microstructure of a sample membrane in Example B3.

The surface microstructure of membrane sample B2 was observed with a scanning electron microscope (SEM; JSM-6610LV, manufactured by JEOL Ltd.) at an acceleration voltage of 10 to 20 kV. FIG. 7 illustrates the resultant SEM image (i.e., a secondary electron image) of the surface microstructure of membrane sample B2.

Figure 8:
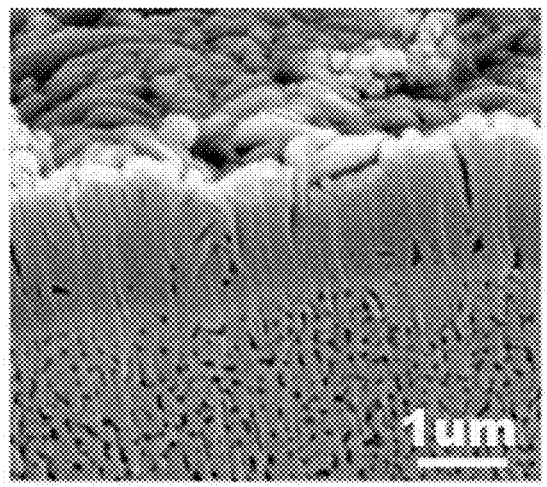
FIG. 8 is a SEM image of a microstructure at a polished cross-sectional surface of a sample composite material in Example B3.

A cross-section of composite material sample B2 was subjected to CP polishing, and the microstructure of the polished cross-section was observed with a scanning electron microscope (SEM) at an acceleration voltage of 10 to 20 kV. FIG. 8 illustrates the resultant SEM image of the microstructure of the polished cross-section of composite material sample B2.

Example B4

Measurement of Porosity

The porosity at the surface of membrane sample B2 was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (96) was determined by dividing the number of pixels of the black areas by the number of all the pixels of the image. The porosity was determined over a 6 μm×6 μm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of membrane sample B2 was also determined. The porosity was determined as in Example B3 except for taking an electron microscopic (SEM) image of the polished cross-section along the thickness of the membrane at a magnification of 10,000 or more. The determination of the porosity was performed on the area of the membrane sample of the polished cross-section. The porosity at the polished cross-section of membrane sample B2 was 3.5% on average (i.e., the average porosity of the membrane areas of three polished cross-sections). The results demonstrate a significantly high density of the membrane formed on the porous substrate.

Example B5

Evaluation of Density (Reference)

Figure 9A:
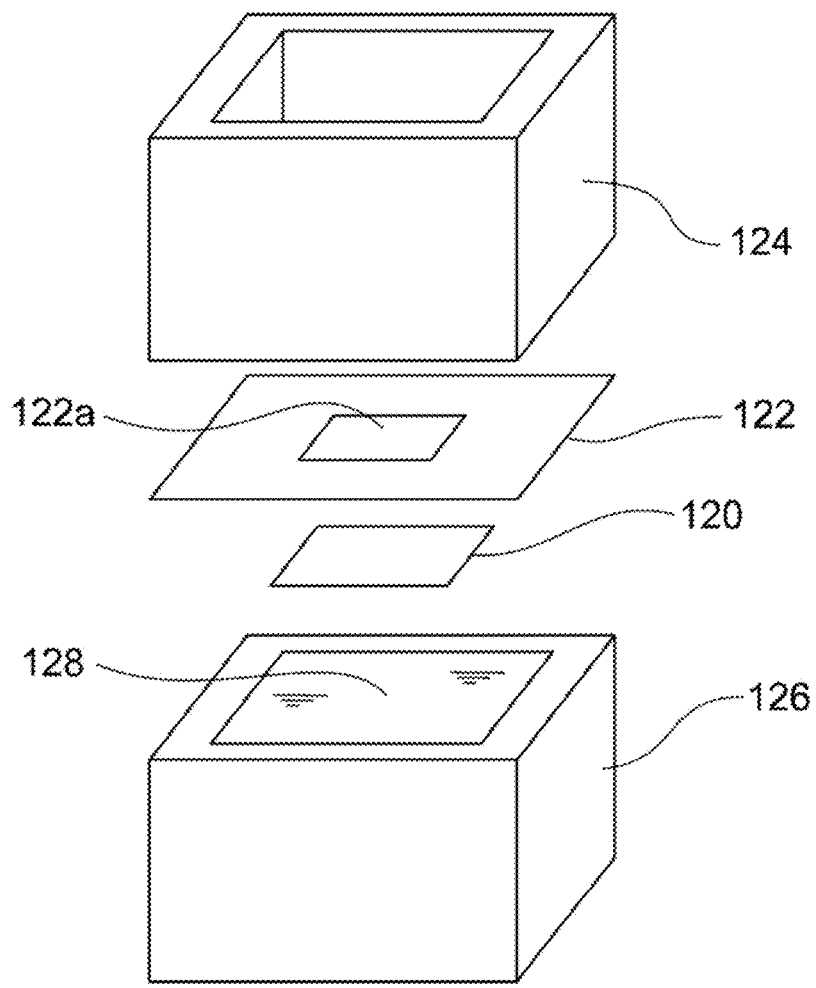
FIG. 9A is an exploded perspective view of a system for evaluating and measuring density in Example B5.
Figure 9B:
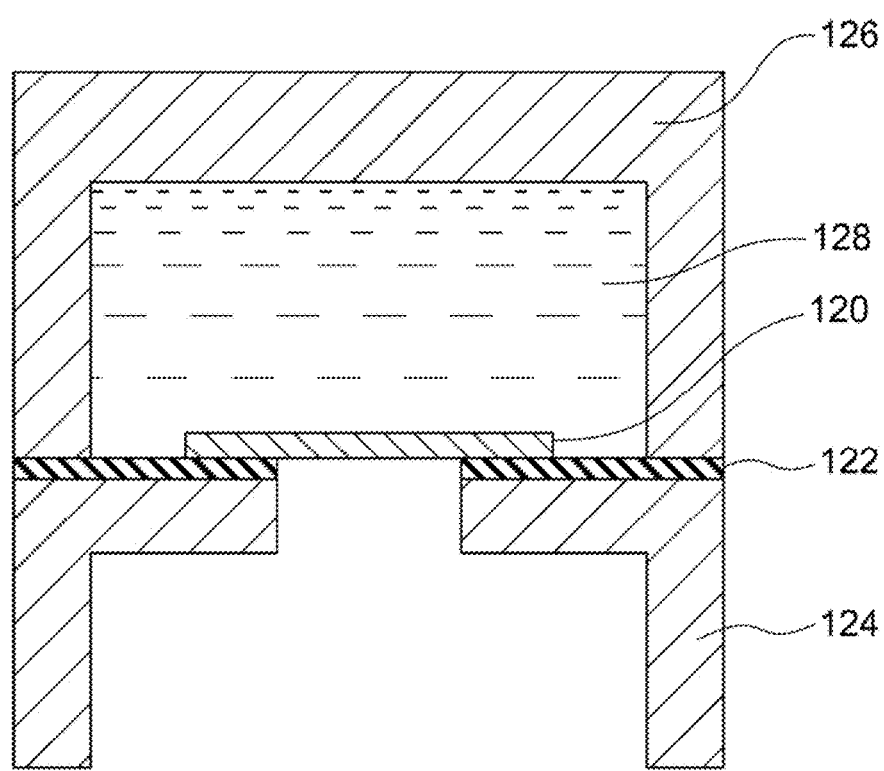
FIG. 9B is a schematic cross-sectional view of a system for evaluating and measuring density in Example B5.

A density evaluation test was performed on membrane samples B1 to B5 for determining whether these samples have high density and thus water impermeability. With reference to FIG. 9A, a silicone rubber sheet 122 having a central opening 22a (0.5 cm×0.5 cm) was bonded to the membrane sample of composite material sample 120 prepared in Example B1 (cut into a piece of 1 cm×1 cm), and the resultant laminate was disposed between two acrylic units 124 and 126 and bonded to these acrylic units. The acrylic unit 124 disposed on the silicone rubber sheet 122 has no bottom, and thus the silicone rubber sheet 122 is bonded to the acrylic unit 124 such that the opening 122a is exposed. The acrylic unit 126 disposed on the porous substrate of composite material sample 120 has a bottom and contains ion-exchange water 128. In this case. Al and/or Mg may be dissolved in the ion-exchange water. Thus, these components are arranged to form an assembly such that the ion-exchange water 128 comes into contact with the porous substrate of composite material sample 120 if the assembly is inverted upside down. After formation of the assembly, the total weight thereof was measured. It should be noted the unit 126 has a closed vent (not shown) and the vent is opened after inversion of the assembly. As illustrated in FIG. 9B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. No change in weight of the ion-exchange water was observed even after the one-week test at 25° C. The results demonstrate that membrane samples B1 to B5 (i.e., functional membranes) exhibit high density and thus water impermeability.

TABLE 2

| Sample No. | Porous substrate | | | LDH |
| | Substrate | Firing temperature (° C.) | Pore size (μm) | Porosity (%) | Membrane Water permeability |
|---|---|---|---|---|---|
| B1 | Alumina | 1100 | 0.02 | 27.2 | No |
| B2 | Alumina | 1150 | 0.1 | 24.6 | No |
| B3 | Alumina | 1200 | 0.6 | 19.3 | No |
| B4 | Zirconia (3YSZ) | 1100 | 0.3 | 44.5 | No |
| B5 | Zirconia (8YSZ) | 1100 | 0.2 | 51.9 | No |

What is claimed is:

1. A separator for a zinc secondary battery comprising a composite material including a porous alumina substrate and a hydroxide-ion-conductive dense membrane disposed on at least one surface of the porous alumina substrate, the hydroxide-ion-conductive dense membrane consisting of a layered double hydroxide dense membrane and having a He permeability per unit area of 10 cm/min·atm or less,
    wherein the porous alumina substrate has a water-permeable structure and an average pore size of 0.001 μm to 1.5 μm, and
    wherein the layered double hydroxide dense membrane is formed from a stock solution containing at least two cations that are different from one another.

2. The separator for a zinc secondary battery according to claim 1, wherein the hydroxide-ion-conductive dense membrane has a He permeability of 1.0cm/min·atm or less.

3. The separator for a zinc secondary battery according to claim 1, wherein the hydroxide-ion-conductive dense membrane has a Zn permeability per unit area of 10 m$^{-2}$·h$^{-1}$ or less as determined by the contact of the membrane with water.

4. The separator for a zinc secondary battery according to claim 3, wherein the hydroxide-ion-conductive dense membrane has a Zn permeability of 1.0 m$^{-2}$·h$^{-1}$ or less.

5. A separator for a zinc secondary battery comprising a composite material including a porous alumina substrate and a hydroxide-ion-conductive dense membrane disposed on at least one surface of the porous alumina substrate, the hydroxide-ion-conductive dense membrane comprising an inorganic material exhibiting hydroxide ion conductivity that includes a layered double hydroxide represented by the formula: $M^{2+}_{1-x}M^{3+}_{x}(OH)_2 A^{n-}_{x/n} \cdot mH_2O$ where $M^{2+}$ represents a divalent cation, $M^{3+}$ represents a trivalent cation, $A^{n-}$ represents an n-valent anion, n represents an integer of 1 or more, x is 0.1 to 0.4, and m is 0 or more, wherein the dense membrane has a He permeability per unit area of 10 cm/min·atm or less, and wherein the porous alumina substrate has a water-permeable structure and an average pore size of 0.001μm to 1.5μm and wherein the layered double hydroxide dense membrane is formed from a stock solution containing at least two cations that are different from one another.

6. The separator for a zinc secondary battery according to claim 5, wherein, in the formula, $M^{2+}$ comprises $Mg^{2+}$, $M^{3+}$ comprises $Al^{3+}$, and $A^{n-}$ comprises $OH^-$ and/or $CO_3^{2-}$.

7. The separator for a zinc secondary battery according to claim 5, wherein the layered double hydroxide comprises an agglomeration of platy particles, and the platy particles are oriented such that the tabular faces of the platy particles are substantially perpendicular to or oblique to the surface of the dense membrane.

8. The separator for a zinc secondary battery according to claim 1, wherein the hydroxide-ion-conductive dense membrane has a thickness of 100 μm or less.

9. The separator for a zinc secondary battery according to claim 1, wherein the surface of the porous alumina substrate has a porosity of 10% to 60%.

10. A zinc secondary battery including the separator comprising the composite material according to claim 1.

11. The separator for a zinc secondary battery according to claim 5, wherein the hydroxide-ion-conductive dense membrane consists of a layered double hydroxide dense membrane.

12. The separator for a zinc secondary battery according to claim 1, wherein the hydroxide-ion-conductive dense membrane has a thickness of 5 μm or less.

13. The separator for a zinc secondary battery according to claim 5, wherein the hydroxide-ion-conductive dense membrane has a thickness of 5 μm or less.

14. The separator for a zinc secondary battery according to claim 1, wherein the porous alumina substrate allows water permeation through its entire thickness.

15. The separator for a zinc secondary battery according to claim 5, wherein the porous alumina substrate allows water permeation through its entire thickness.

* * * * *